United States Patent
Ungureanu et al.

(10) Patent No.: US 10,031,636 B2
(45) Date of Patent: Jul. 24, 2018

(54) REMOTING DESKTOP DISPLAYS USING MOVE REGIONS

(75) Inventors: Dorin Ungureanu, Duvall, WA (US); Mohamed Sadek, Sammamish, WA (US); Robert W. Schmieder, Snoqualmie, WA (US); Harneet Sidhana, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 13/227,491

(22) Filed: Sep. 8, 2011

(65) Prior Publication Data

US 2013/0067344 A1  Mar. 14, 2013

(51) Int. Cl.
*G06F 3/048* (2013.01)

(52) U.S. Cl.
CPC ...... *G06F 3/048* (2013.01); *G06F 2203/0383* (2013.01)

(58) Field of Classification Search
CPC ........ G06F 3/0481; G06F 1/163; G06F 3/011; G06F 3/016; G06F 21/00; G06F 3/048; G06F 2203/0383
USPC .......................................... 715/740; 345/557
See application file for complete search history.

(56) References Cited

U.S. PATENT DOCUMENTS

| | | | |
|---|---|---|---|
| 7,412,662 B2 | 8/2008 | Sadek et al. | |
| 7,439,937 B2* | 10/2008 | Ben-Shachar et al. | 345/1.1 |
| 8,307,103 B2* | 11/2012 | Abdo et al. | 709/230 |
| 2004/0151390 A1* | 8/2004 | Iwamura | 382/236 |
| 2004/0181579 A1* | 9/2004 | Huck et al. | 709/205 |
| 2006/0031854 A1* | 2/2006 | Godwin | 719/328 |
| 2006/0123141 A1* | 6/2006 | Pinedo et al. | 710/5 |
| 2006/0129634 A1* | 6/2006 | Khouzam et al. | 709/203 |
| 2006/0184545 A1* | 8/2006 | Suzuki | 707/10 |
| 2006/0184614 A1* | 8/2006 | Baratto et al. | 709/203 |
| 2007/0052723 A1* | 3/2007 | Subramanian et al. | 345/619 |
| 2007/0174410 A1 | 7/2007 | Croft et al. | |
| 2007/0300205 A1* | 12/2007 | Scian et al. | 717/106 |
| 2008/0238929 A1 | 10/2008 | Abdo et al. | |
| 2008/0244458 A1* | 10/2008 | Brugiolo | G06F 9/4443 715/853 |
| 2009/0189892 A1* | 7/2009 | Desai et al. | 345/419 |

(Continued)

OTHER PUBLICATIONS

"Desktop Composition Mode Management", Retrieved at <<http://msdn.microsoft.com/en-us/library/dd342759(v=prot.10).aspx>>, Retrieved Date: Apr. 29, 2011, pp. 2.

*Primary Examiner* — John Repsher, III
(74) *Attorney, Agent, or Firm* — Patent GC LLC

(57) ABSTRACT

A desktop display over a remote connection is updated by detecting, at their origin, changes in the desktop that reflect movement of an image, such as window scrolls, window moves and other movements of regions. For every frame of the desktop that is composed, moves can be detected. The offsets and regions of these moves are transformed into desktop space. A list of moves and other information about changed regions in the desktop display provide both an indication of moved image regions and move parameters, and image data that has otherwise changed. The moved image regions are moved at the destination by applying the move parameters, without transferring image data for the moved region to the remote device, while the remaining changed portion of the desktop is copied over the connection to the remote device.

16 Claims, 5 Drawing Sheets

(56) References Cited

U.S. PATENT DOCUMENTS

2009/0199128 A1    8/2009   Matthews et al.
2009/0210817 A1*   8/2009   Schmieder et al. .......... 715/781
2010/0254603 A1   10/2010   Rivera
2010/0271379 A1*   10/2010   Byford et al. ................ 345/545

* cited by examiner

REMOTING DESKTOP DISPLAYS USING MOVE REGIONS

BACKGROUND

There are a variety of systems that allow a computer to be accessed remotely. One kind of system provides remote access to a "desktop" environment, in which a user has access to a typical personal computer configuration, with the ability to run multiple applications and access storage. It is common in a desktop environment to have different applications displayed in different display areas, which may overlap on a display.

When the display for a desktop is rendered, and then displayed remotely, existing technologies send the image data for changed regions in the display over the network. In particular, these changed regions are called "dirty" regions, and are sent across the network.

There are cases in which updates to the desktop result in regions moving across the desktop. Such region movement typically happens as a result of window scrolls or window moves. However, if the remote updating method involves sending data for areas that have changed, an entire scrolled or moved window will be sent.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Sending desktop display updates to a remote connection is improved by detecting, at their origin, changes in the desktop that reflect movement of an image, such as window scrolls, window moves and other region movements. For every frame of the desktop that is composed, moves can be detected, for example, for scrolls as same surface copies in the desktop redirection surfaces, or, as another example, at the desktop composition tree as commands that change window offsets. The offsets and regions of these moves are transformed into desktop space. A list of moves is merged with other information about changed regions in the desktop display to provide both an indication of moved image regions and move parameters, and image data that has otherwise changed. The moved image regions are moved at the destination by applying the move parameters, without transferring pixels over the connection to the remote device, while the remaining changed portion of the desktop is copied over the connection to the remote device.

In some instances, the desktop is a combination of several surfaces. Move data computed for several surfaces in surface coordinates, such as for two or more windows, is combined in desktop coordinates. Scroll information commonly would arise at its origin in surface coordinates. In some instances, a surface is updated more than once between each update to the desktop display. Similarly, the desktop can be updated more than once between each transmission to the remote device. In such cases, move information for different renderings of a surface is merged before determining which subregions of the desktop represent moves.

Accordingly, in one aspect, data is received that describes changes in the desktop display from one frame to a next frame, including any move operation involving movement of a region from one position in the desktop display to another position in the desktop display. Changes in the desktop display can include, for example, changes from scroll operations applied to a surface or changes in a composition tree positioning a surface on the desktop. From this data, information describing moved image regions and move parameters, and information describing changed image data, is generated. The information describing moved image regions and move parameters, and information describing changed image data, is sent to a remote display device. The sending of information to the remote device is accomplished without transferring image data for the moved regions to the remote device.

In one implementation, for each rendering of a desktop, move information is merged with move information from a previous rendering of the desktop, if the desktop is rendered again prior to sending the information from the previous rendering of the desktop. Similarly, for each rendering of a surface, move information is merged with move information from a previous rendering of the surface, if the surface is rendered again prior to rendering the desktop.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which desktop remoting can be implemented.

Figure 1:
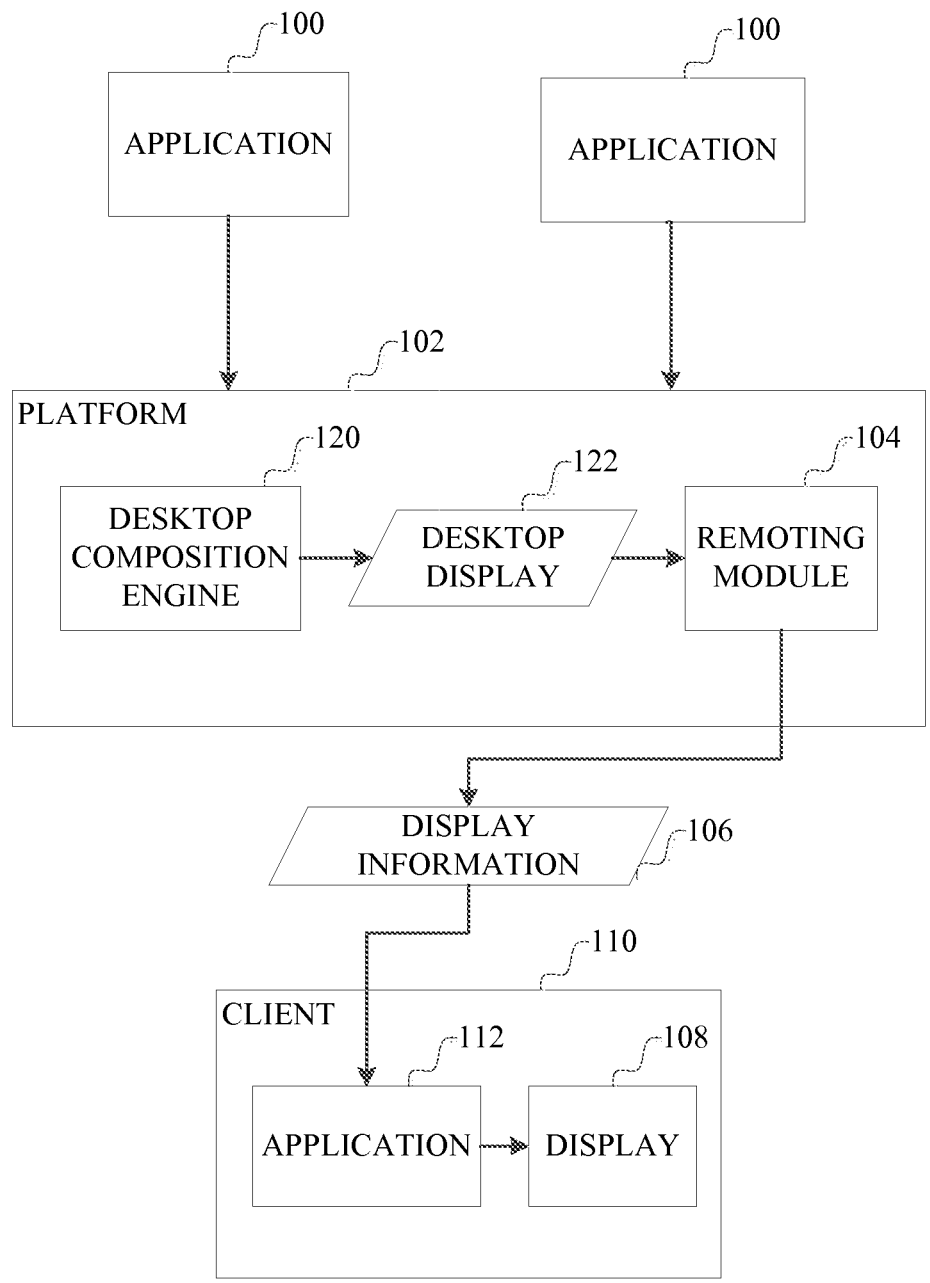
FIG. 1 is a block diagram of a system providing a remote desktop display.

Referring to FIG. 1, one or more applications 100 are running on a platform 102, which is a general purpose computer such as a server with an operating system. The platform includes a remoting module 104 for providing a remote display of the desktop. In particular, the remoting module 104 periodically sends display information 106 to a remote display 108 at a client 110, such as by using a Remote Desktop Protocol (RDP), or other similar protocol based on the ITU-T T.128 application sharing protocol or similar protocol. The client 110 has an application 112 that implements a protocol that receives display information 106 from the remoting module 104 and updates the remote display 108 accordingly. For example, the application 112 can include an internet browser with an RDP client that connects over the internet to a service that provides the platform 102. Using RDP, the display information 106 includes a bit map of all of the regions of the display that have changed since a previous frame, and, for regions where the change is caused by movement of a display area, data describing the region and the move operation. The application 112 implementing RDP at the client updates the remote display 108 using the sent bit maps and region information.

The platform 102 includes a desktop composition engine 120 that receives information from the applications 100 to compose a desktop display 122. Information describing the desktop display is provided to the remoting module 104 for transmission to the client 110.

As will be described in more detail below, the desktop composition engine detects window scrolls, window moves, and other operations that involve moving regions across the desktop. For every frame of the desktop that is composed, moves can be detected, for example, for scrolls as same surface copies in the desktop redirection surfaces, or, as another example, at the desktop composition tree as commands that change window offsets. The offsets and regions of these moves are transformed into desktop space. A list of moves is merged with other information about changed regions in the desktop display to provide both an indication of moved image regions and move parameters, and image data that has otherwise changed. The moved image regions are moved at the destination by applying the move parameters, without transferring pixels over the connection to the remote device, while the remaining changed portion of the desktop is copied over the connection to the remote device.

Figure 2:
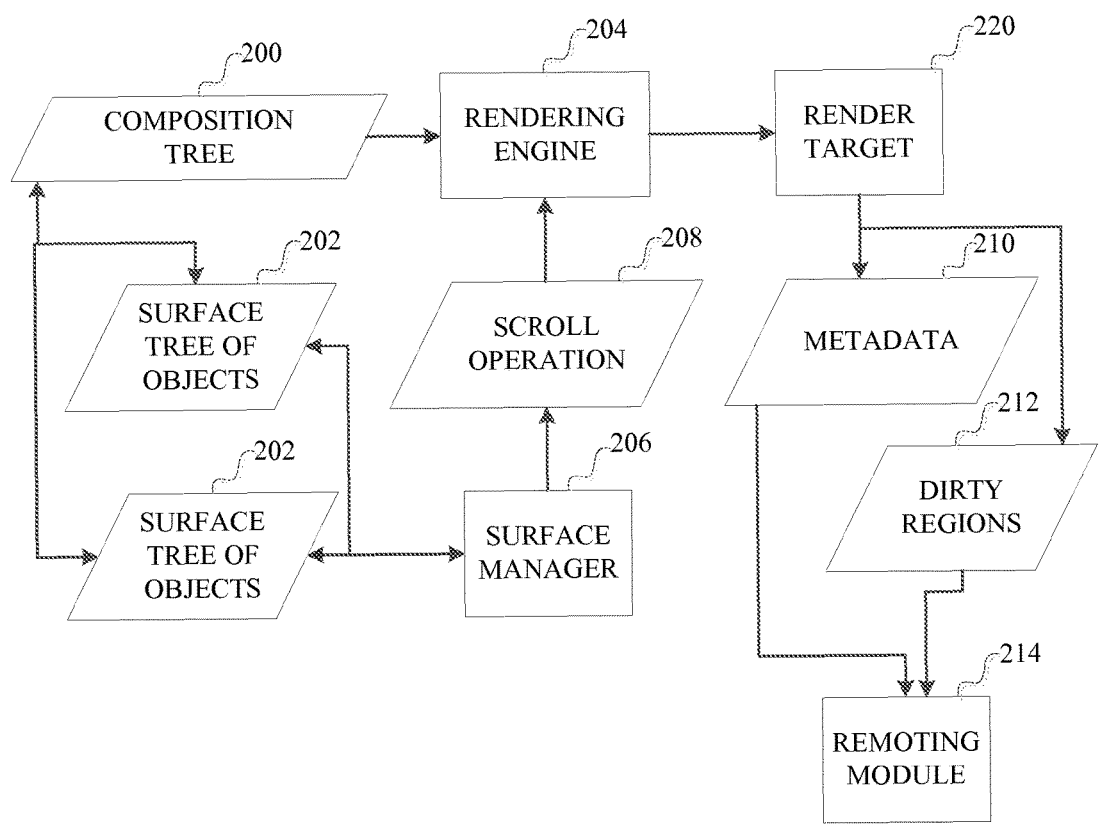
FIG. 2 is a data flow diagram illustrating an example implementation of move detection.
Figure 3:
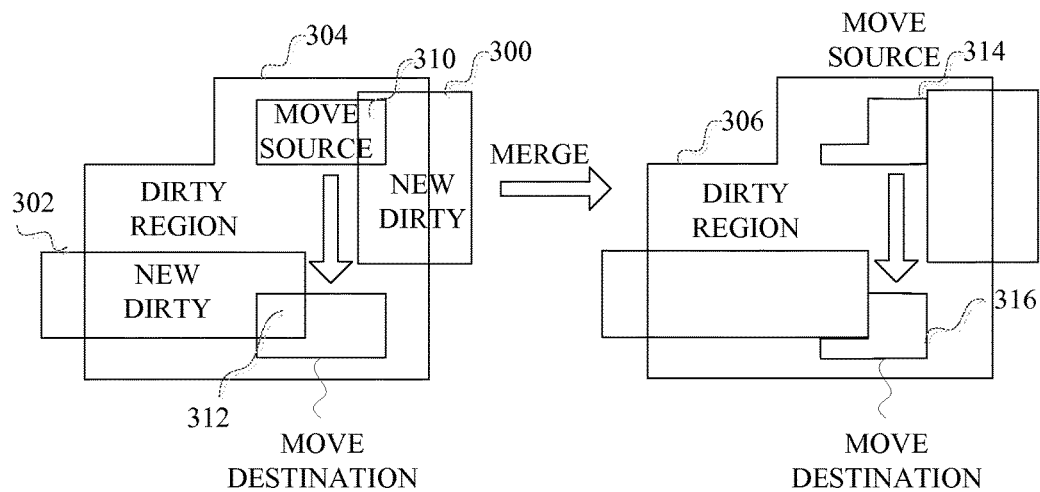
FIGS. 3 and 4 illustrate examples of merge rules.

Given this context, an example implementation of such a system will now be described in more detail in connection with FIGS. 2-4.

In connection with example implementation described in connection with FIG. 2, a desktop can be represented as a combination of surfaces, called a composition tree 200, with each surface being defined a position in the desktop and its own tree of objects 202. The tree of objects represents a set of objects each having a position in surface coordinates and image data such as a bitmap. Clipping and other effects can be applied and represented in this tree of objects. For each surface, the set of objects is rendered by a rendering engine 204, and the set of surface images are combined together, to produce the desktop.

Move operations that occur on a window can be detected at several points in the rendering of the desktop. Scroll operations 208, for example, can be detected at the surface object by intercepting surface rendering calls that contain scrolls from the surface manager 206. Other operations can be detected by the rendering engine 204 detecting changes in the tree of objects. For example, if there is any difference in two consecutive frames, the tree of objects rendered for one frame is different from the tree of objects rendered in another frame. If the difference involves a different position of the surface in the desktop, or a different position within the surface of the same image data, such a difference represents a move operation.

The rendering engine 204, for a given frame, renders the frame to a render target 220. Composition tree rendering generates dirty regions 212 and metadata 210 (representing the changed regions in the frame from the previous frame) from the scroll information 208 and changes in the composition tree 200. The metadata 210 is processed by the remoting module 214 into an encoding of dirty regions of the last presented desktop. This encoding can be commands indicating changed image data and moved image regions and move parameters. For example, such an encoding can be implemented by RDP screen copy or blit commands, specifying a screen region and move parameters, and otherwise changed or dirty regions for which image data can be sent over RDP.

The metadata 210 is a combination of information about scrolling, and changes in the composition tree, for multiple surfaces, for one or more renderings of each surface. To account for one surface occluding another, or for one rendering of a surface to overwrite a previous rendering of the surface, or for one rendering of the desktop to overwrite a previous rendering of the desktop, the move information represented by the metadata 210 is merged to provide a single representation of the changed or "dirty" region of the desktop, and, within that, moved image regions and move parameters.

To support implementation of such merging, a move data array is maintained for each surface, and for the desktop. This move data array is updated for each rendering of the surface, or of the desktop. The move data array is an array of ordered move data regions together with a union of all dirty regions. The move data array for a surface is emptied when the surface is rendered (and merged with any previous data for that surface since the last rendering of the desktop). The move data array for the desktop is emptied when the desktop is rendered (and merged with any previous data for that surface since the last transmission to the remote client). When the composition engine renders a frame, it processes the move data arrays for the dirty surfaces, clears the move data and dirty regions out of the surface move data arrays and converts them to coordinates to desktop space and aggregates them into the desktop move data array. When the desktop is to be presented to the remoting client, the desktop move data arrays are aggregated to produce commands for the remoting client.

Examples of merge rules will now be described in connection with FIGS. 3-4. These merge rules apply for surface move data and for desktop move data. Merging of desktop move data also accounts for occlusion.

Move data regions are processed in the order in which they are added to the array. When adding a dirty region 300 or 302 to the move data array that intersects a dirty region 304, the new region 300 or 302 is unioned into the existing dirty region 304 as shown at 306. When adding a dirty region that intersects a move data region, the intersection of the dirty region with the source (shown at 310) of the move data region and the intersection of the dirty region with the destination (312) of the move data region, then translated back to the source by the move data offset, are removed from the move data region, as shown at 314 and 316 respectively in FIG. 3.

Figure 4:
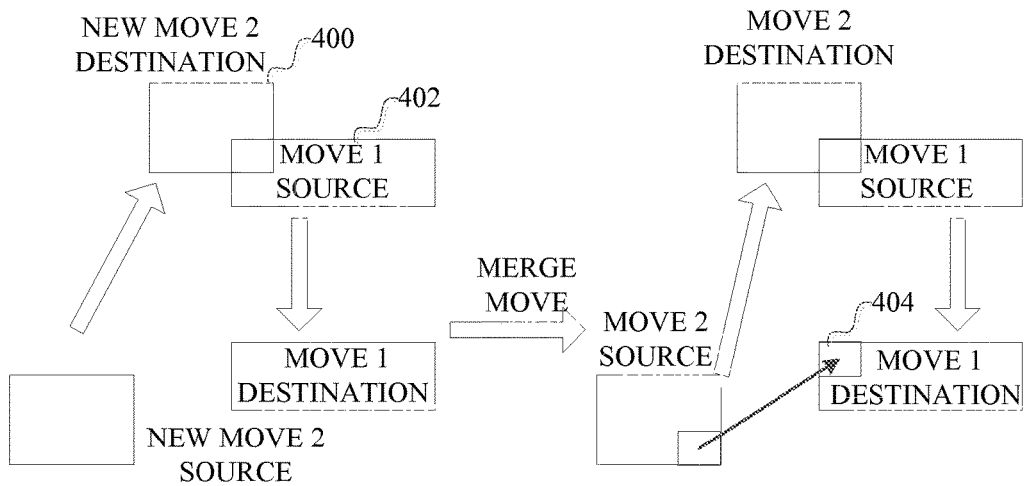

Referring to FIG. 4, when adding an in surface copy move data to a move data array, the in surface copy move data region is added to the move data array dirty region. When the destination of a move region 400 overlaps the source 402 of a second region they are concatenated, with the two moves replaced with a single move. The intersection of the source of move 1 is translated back with the inverse offset of move 1 to calculate the sources of the move. The same intersection is translated with the move 2 offset to obtain the destination of the resulting combined move, as shown 404.

When combining surface moves in the desktop, the dirty regions of an occluded surface are overwritten by the content of the occluded surface. Thus, if a surface is entirely occluded, its dirty regions can be ignored.

Figure 5:
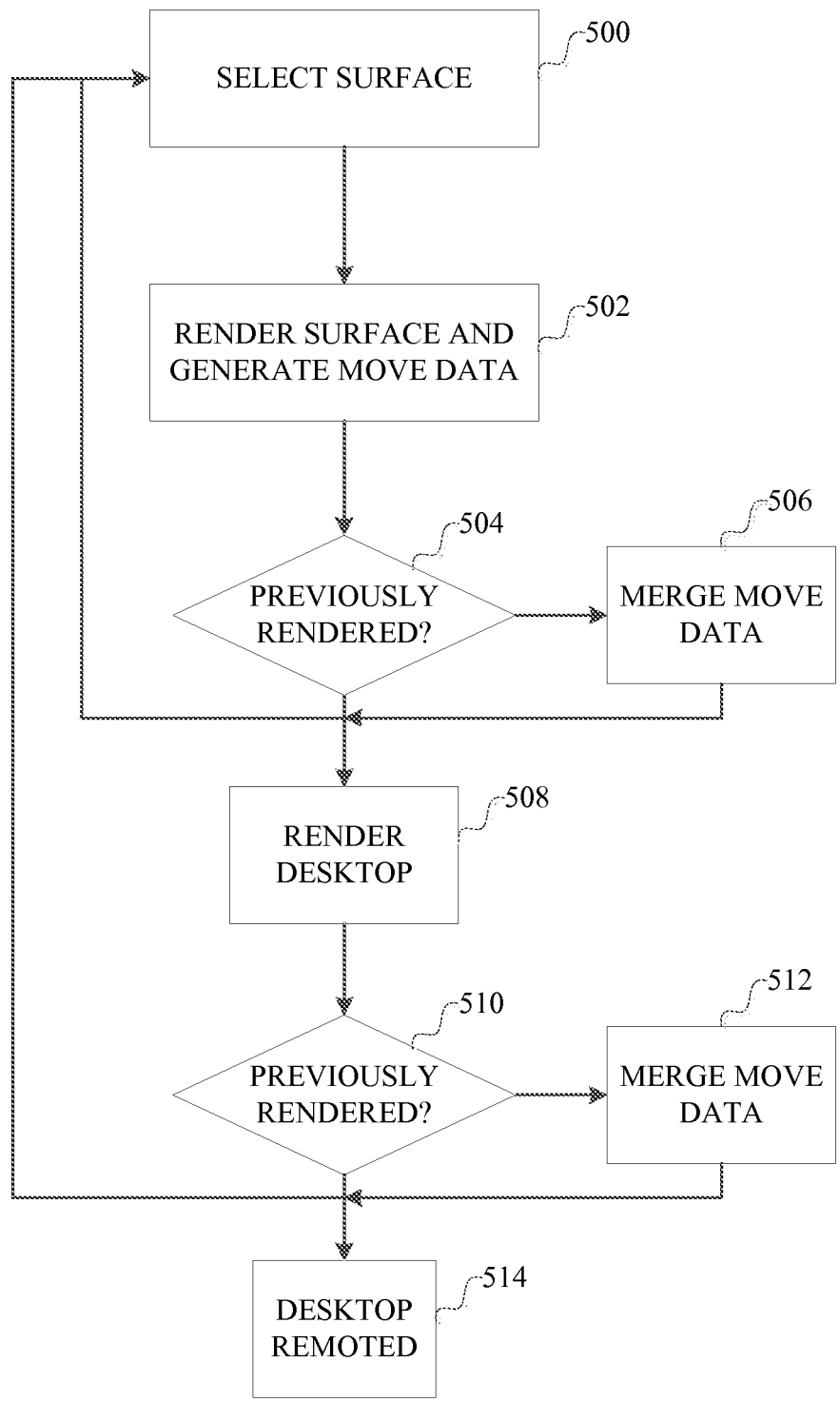
FIG. 5 is a flow chart illustrating an example operation of the system of FIG. 2.

Referring now to FIG. 5, a flow chart describing this example implementation will now be described.

Given a composition tree rendering a desktop including multiple surfaces, a surface is selected 500. The surface is rendered and move data is generated 502. If that surface was previously rendered since the last desktop rendering, as determined at 504, the move data for the surface is merged with the move data from the prior rendering. This process repeats for other selected surfaces. After the desktop rendering is initiated, as indicated at 506, the desktop is rendered and move data is generated 508. If the desktop was previously rendered since the last remoting of the desktop, as determined at 510, the move data for the desktop is merged 512 with the move data from the prior rendering. This process repeats until the desktop is to be remoted, as indicated at 514, at which time the encoding of the dirty regions and move regions is transmitted to a remote client.

With such an implementation, moved image regions can be efficiently encoded in a desktop remoting protocol. In particular, a remote client can be instructed to perform a screen copy of a moved region given an indication of the region and move parameters. This efficient encoding reduces bandwidth utilization, and provides better display performance on the remote client.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
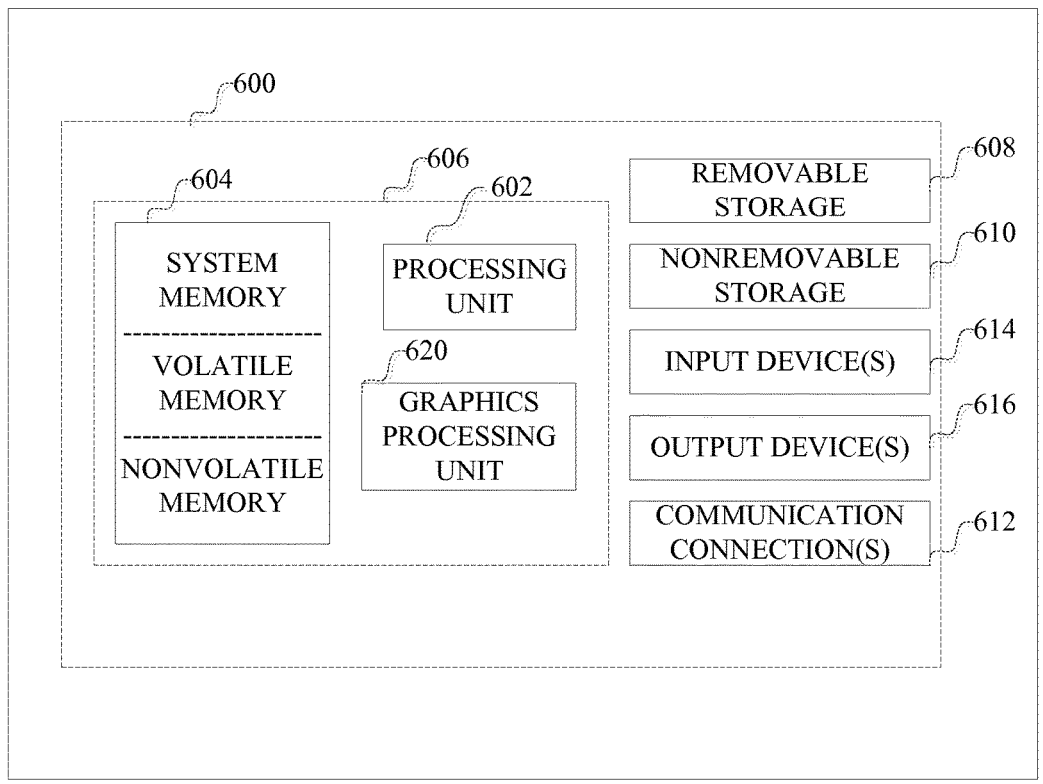
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

Such a system can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process, performed at a server computer, comprising:
   rendering, in memory of the server computer, a desktop composition tree representing display data for a desktop display including at least one surface for an application and a desktop;
   processing the desktop composition tree to identify changes in the desktop composition tree resulting in changes in the display data for the desktop display from a first frame to a next frame in a sequence of frames produced for the desktop display over time;
   storing the identified changes in a plurality of move arrays, including at least one move array for the at least one surface and a move array for the desktop, the plurality of move arrays storing any move operation involving movement of a region from one position in the desktop display to another position in the desktop display, and further storing dirty regions for the at least one surface and dirty regions for the desktop;

generating, in the memory of the server computer, based on the identified changes, information describing moved regions of the desktop display and move parameters, including for each moved region an indication of a respective moved region and respective parameters of a move operation applied to the respective moved region, the respective parameters including information indicative of an offset of the respective moved region between the first frame and the next frame, and information describing dirty regions of the desktop display, including changed image data for the desktop display other than in the moved regions, by merging the at least one move array for the at least one surface and the move array for the desktop, including merging the dirty regions for the at least one surface and the dirty regions for the desktop; and sending over a computer network to a remote display device, as display data for the the next frame, the information describing the moved regions of the desktop display and the move parameters, without image data of the desktop display for the moved regions, and the information describing the dirty regions of the desktop display, including the changed image data for the desktop display other than in the moved regions.

2. The computer-implemented process of claim 1, wherein the generating comprises, for each rendering of the desktop, merging the information describing the moved regions of the desktop display and the move parameters with information from a previous rendering of the desktop, wherein the desktop is rendered again prior to sending the information from the previous rendering of the desktop.

3. The computer-implemented process of claim 1, wherein processing the desktop composition tree to identify changes comprises detecting scroll operations applied to the at least one surface, and wherein generating the information describing the moved regions of the desktop display and the move parameters is based on at least the detected scroll operations.

4. The computer-implemented process of claim 1, wherein the desktop composition tree further comprises a plurality of surfaces, wherein each surface of the plurality of surfaces represents an application, and each surface of plurality of surfaces has a respective move array and respective dirty regions.

5. The computer-implemented process of claim 1, wherein the generating comprises, for each rendering of the at least one surface, merging the information describing the moved regions of the desktop display and the move parameters with information from a previous rendering of the at least one surface, wherein the at least one surface is rendered again prior to rendering the desktop display.

6. The computer-implemented process of claim 5, wherein the merging the information describing the moved regions of the desktop display and the move parameters with the information from the previous rendering of the at least one surface comprises:
unioning new dirty regions with existing dirty regions;
for each new dirty region:
in response to a determination that there is a first intersection between a respective new dirty region and a source of a moved region, removing the first intersection from the source of the moved region; and in response to a determination that there is a second intersection between the respective new dirty region and a destination of the moved region, removing, from the source of the moved region, the second intersection as translated back to the source of the moved region by an offset from move parameters for the moved region.

7. The computer-implemented process of claim 1, wherein the sending over a computer network to the remote display device is accomplished without transferring pixel data for the moved regions of the desktop display to the remote display device.

8. A server computer comprising:
a processor and memory;
a computer storage medium and computer program instructions stored on the computer storage medium which, when processed by the processor, instruct the processor to perform a process comprising:
rendering, in the memory, a desktop composition tree representing display data for a desktop display including at least one surface for an application and a desktop;
processing the desktop composition tree to identify changes in the desktop composition tree resulting in changes in the display data for the desktop display from a first frame to a next frame in a sequence of frames produced for the desktop display over time;
storing, in the memory, the identified changes in a plurality of move arrays, including at least one move array for the at least one surface and a move array for the desktop, the plurality of move arrays storing any move operation involving movement of a region from one position in the desktop display to another position in the desktop display, and further storing dirty regions for the at least one surface and dirty regions for the desktop;
generating, in the memory, based on the identified changes, information describing moved regions of the desktop display and move parameters, including for each moved region an indication of a respective moved region and respective parameters of a move operation applied to the respective moved region, the respective parameters including information indicative of an offset of the respective moved region between the first frame and the next frame, and information describing dirty regions of the desktop display, including changed image data of the desktop display other than in the moved regions, by merging the at least one move array for the at least one surface and the move array for the desktop, including merging the dirty regions for the at least one surface and the dirty regions for the desktop; and
sending over a computer network to a remote display device, as display data for the the next frame, the information describing the moved regions of the desktop display and the move parameters, without image data of the desktop display for the moved regions, and the information describing the dirty regions of the desktop display, including the changed image data of the desktop display other than in the moved regions.

9. The server computer of claim 8, wherein the generating comprises, for each rendering of the desktop, merging the information describing the moved regions of the desktop display and the move parameters with information from a previous rendering of the desktop, wherein the desktop is rendered again prior to sending the information from the previous rendering of the desktop.

10. The server computer of claim 8, wherein processing the desktop composition tree to identify changes comprises detecting scroll operations applied to the at least one surface, and wherein generating the information describing the moved regions of the desktop display and the move parameters is based on at least the detected scroll operations.

11. The server computer of claim 8, wherein the desktop composition tree further comprises a plurality of surfaces, wherein each surface of the plurality of surfaces represents an application, and each surface of the plurality of surfaces has a respective move array and respective dirty regions.

12. The server computer of claim 8, wherein the generating comprises, for each rendering of the at least one surface, merging the information describing the moved regions of the desktop display and the move parameters with information from a previous rendering of the at least one surface, wherein the at least one surface is rendered again prior to rendering the desktop display.

13. The server computer of claim 12, wherein the merging information describing the moved regions of the desktop display and the move parameters with the information from the previous rendering of the surface comprises:
  unioning new dirty regions with existing dirty regions;
  for each new dirty region:
    in response to a determination that there is a first intersection between a respective new dirty region and a source of a moved region, removing the first intersection from the source of the moved region;
    in response to a determination that there is a second intersection between the respective new dirty region and a destination of the moved region, removing, from the source of the moved region, the second intersection as translated back to the source of the moved region an offset from move parameters for the moved region.

14. A computing machine including a processor and a computer storage medium storing computer program instructions, the computing machine, when the computer program instructions are processed by the processor, comprising:
  a desktop rendering engine having an input for receiving a desktop composition tree including information describing a composition of one or more surfaces for one or more applications and a desktop for a desktop display, and an output providing a sequence of frames as a rendered desktop display over time;
  wherein the desktop rendering engine is configured to process the desktop composition tree to identify changes in the desktop composition tree resulting in changes in the display data for the desktop display from a first frame to a next frame in a sequence of frames produced for the desktop display over time, and to store the identified changes in a plurality of move arrays, including at least one move array for the at least one surface and a move array for the desktop, the plurality of move arrays storing any move operation involving movement of a region from one position in the desktop display to another position in the desktop display, and further storing dirty regions for the at least one surface and dirty regions for the desktop;
  wherein the desktop rendering engine is configured to generate, based on the detected changes, information describing moved regions within the rendered desktop display and move parameters, including for each moved region an indication of a respective moved region and respective parameters of a move operation applied to the respective moved region, the respective parameters including information indicative of an offset of the respective moved region between the first frame and the next frame, and to generate information describing dirty regions of the desktop display including changed image data for the desktop display other than in the moved regions by merging the at least one move array for the at least one surface and the move array for the desktop, including merging the dirty regions for the at least one surface and the dirty regions for the desktop; and
  a remoting server that sends over a computer network to a remote display device, as display data for the next frame, the information describing the moved regions within the rendered desktop display and the move parameters, without image data of the rendered desktop display for the moved regions, and the information describing the dirty regions of the desktop display including the changed image data for the desktop display other than in the moved regions.

15. The computing machine of claim 14, wherein the desktop rendering engine is further configured to, for each rendering of the desktop, merge the information describing the moved regions within the rendered desktop display and the move parameters with move information from a previous rendering of the desktop, wherein the desktop rendering engine is further configured to render the desktop again prior to sending the move information from the previous rendering of the desktop.

16. The computing machine of claim 14, wherein, to process the desktop composition tree to identify changes, the desktop rendering engine is further configured to detect scroll operations applied to the at least one surface, and wherein the desktop rendering engine is configured to generate the information describing the moved regions within the rendered desktop display and the move parameters based on at least the detected scroll operations.

* * * * *